Patented Feb. 12, 1946

2,394,597

UNITED STATES PATENT OFFICE 2,394,597

PREPARATION OF ORGANIC
DIISOCYANATES

Joseph B. Dickey, James M. Straley, and Theodore E. Stanin, Rochester, N. Y., assignors to Eastman Kodak Company, Rochester, N. Y., a corporation of New Jersey No Drawing. Application July 9, 1942,
Serial No. 450,306

6 Claims. (Cl. 260—453)

This invention relates to a process for preparing organic diisocyanates.

It is known that aromatic monoisocyanates can be prepared by dehydrating aromatic hydroxamic acids with a dehydrating agent such as thionyl chloride. Marquis in Compt. Rend. 143, 1163 (1906) shows the formation of phenyl isocyanate by such a process which has come to be known as the Lossen rearrangement. While aromatic hydroxamic acids are known to undergo the Lossen rearrangement upon dehydration, aliphatic hydroxamic acids have not been observed to undergo an analogous change (Franklin, Chem. Rev. 14, 243 (1934), except in the case of the higher molecular weight compounds. Thus, Nicolet and Pelc in J. Am. Chem. Soc. 44, 1145 (1922) have shown that oleohydroxamic acid yields heptadecenyl isocyanate upon dehydration with acetic anhydride.

We have now found that aliphatic diisocyanates can be prepared by dehydration of aliphatic dihydroxamic acids and their metal salts. It is accordingly an object of our invention to provide a process for preparing diisocyanates. Other objects will become apparent hereinafter.

In accordance with our invention, we prepare aliphatic diisocyanates by dehydrating aliphatic dihydroxamic acids and their metal salts. As aliphatic dihydroxamic acids those which can be represented by the following general formula are exemplary:

$$\text{HON}-\overset{\text{OM}}{\underset{\phantom{a}}{\text{C}}}-\text{R}-\overset{\text{OM}}{\underset{\phantom{a}}{\text{C}}}=\text{NOH}$$

wherein M represents hydrogen or a metal and R represents a divalent organic radical the carbon atoms of which are attached to the $$\diagdown\text{C}=\text{NOH}\diagup$$

groups do not lie in an aromatic nucleus. Such divalent organic radicals include: trimethylene, tetramethylene, pentamethylene, hexamethylene, heptamethylene, octamethylene, decamethylene,

—CH₂—CH₂—O—CH₂—CH₂—

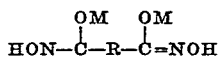

—CH₂—CH₂—S—CH₂—CH₂—

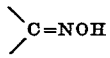

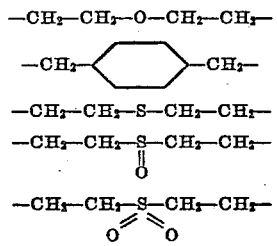

and

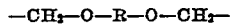

wherein R represents a divalent organic radical.
Aliphatic dihydroxamic acids can be prepared by treating the esters of dibasic acids with hydroxylamine in alcoholic solutions according to the method of Lossen, Annalen 150, 314 (1869). The metal salts of the aliphatic dihydroxamic acids can be prepared by treating the dihydroxamic acids with the appropriate base. Alkali metal salts are advantageously employed in our new process.

As dehydrating agents, we have found that thionyl chloride or carbonyl chloride (phosgene) are advantageously employed. Anhydrides of carboxylic acids, e. g. acetic anhydride, can be employed. However, the ensuing acetic acid reacts rapidly with the diisocyanates which are formed.

Our process is advantageously carried out by suspending the dihydroxamic acid or salt in a liquid which is inert to the dihydroxamic acid or salt and to the diisocyanate, and heating the suspension in the presence of a dehydrating agent.

The following examples will serve to illustrate our new process:

*Example 1*

115 parts of sebacic dihydroxamic acid were suspended in 2000 parts of dry benzene. The mixture was thoroughly stirred and refluxed. While refluxing phosgene was introduced until a clear solution was obtained. About 470 parts of phosgene were required. After cooling, the solution was washed several times with ice water and the benzene then removed in vacuo. The residue when heated to about 160° C. at atmospheric pressure began to decompose. The source of heat was removed. After decomposition was complete, distillation of the residue was effected under reduced pressure and the distillate collected up to 200° C. at about 18 mm. of Hg pressure. Upon redistillation 45 to 60 parts of octamethylene diisocyanate boiling at 126° to 128° C. at 2 mm. of Hg pressure were obtained.

*Example 2*

138 parts of the disodium salt of sebacic dihydroxamic acid were suspended in 2500 parts of dry benzene. To the resulting suspension were added 120 parts of thionyl chloride, during the course of an hour, while stirring vigorously. The mixture was then refluxed for 2 hours. The mixture was cooled and washed several times with ice water and the benzene removed in vacuo. The residue was heated under atmospheric pressure until decomposition set in. The source of heat was then removed. After decomposition was complete, the residue was distilled under reduced pressure and the distillate collected up to 200° C. at about 18 mm. of Hg pressure. Upon redistillation 40 to 72 parts of octamethylene diisocyanate boiling at 126° to 128° C. at 2 mm. of Hg pressure were obtained. The decomposition in this case was much smoother than in Example 1, and the first distillate much cleaner.

The sebacic dihydroxamic acid and the disodium salt thereof used in this example and in Example 1 were prepared as follows: To 181 parts of hydroxylamine hydrochloride dissolved in 1000 parts of boiling methanol were added 157 parts of sodium hydroxide in 750 parts of methanol. The sodium chloride which formed was removed by filtration or decantation, and the filtrate was added to 156 parts of methyl sebacate with stirring. The resulting solution was allowed to stand for about 12 hours. The white granular disodium salt of sebacic dihydroxamic acid which separated from the solution was filtered off and dried. To prepare the dihydroxamic acid, the disodium salt was dissolved in 2000 parts of boiling 8 percent acetic acid and the mixture allowed to cool. The sebacic dihydroxamic acid which separated out was filtered off and dried. 130 to 150 parts of the acid, melting at 148° to 151° C. with decomposition, were obtained.

*Example 3*

137 parts of brassylic dihydroxamic acid were suspended in 1500 parts of dry toluene. The mixture was refluxed and then agitated by the rapid introduction of phosgene. When a clear solution had formed, the solution was cooled and washed several times with ice water. The toluene was then removed in vacuo. The residue was heated under atmospheric pressure until decomposition set in. The source of heat was then removed. After decomposition was complete, the residue was distilled under reduced pressure and the distillate collected. In this manner, 50 to 75 parts of hendecamethylene diisocyanate, boiling at 164° to 166° C. at 3 mm. of Hg pressure, were collected.

*Example 4*

262 parts of the disodium salt of azelaic dihydroxamic acid were suspended in 4000 parts of dry benzene. While the mixture was vigorously stirred, 250 parts of thionyl chloride were added during a period of from 1 to 1½ hours. The resulting mixture was then refluxed for 2 hours. The mixture was cooled and washed several times with ice water and the benzene removed in vacuo. The residue was heated under atmospheric pressure until decomposition set in. The source of heat was then removed. After decomposition was complete, the residue was distilled under reduced pressure and the distillate collected. In this manner 75 to 120 parts of heptamethylene diisocyanate, boiling at 112° to 114° C. at 2 mm. of Hg pressure, were obtained.

The diisocyanates obtainable by our process are valuable intermediates in the preparation of linear polymers, resins, wetting agents, waterproofing agents and textile-sizing agents, and are also useful in the identification of certain types of organic compounds.

What we claim as our invention and desire to be secured by Letters Patent of the United States is:

1. A process for preparing an aliphatic diisocyanate comprising heating, in the presence of an agent selected from the group consisting of phosgene and thionyl chloride, a dihydroxamic compound of the following formula:

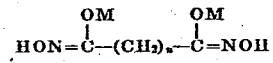

wherein M represents a member selected from the group consisting of hydrogen and metals, and $n$ represents a positive integer of from 3 to 10.

2. A process for preparing an aliphatic diisocyanate comprising heating, in the presence of an agent selected from the group consisting of phosgene and thionyl chloride, in an inert liquid, a dihydroxamic compound of the following formula:

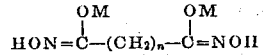

wherein M represents a member selected from the group consisting of hydrogen and metals, and $n$ represents a positive integer of from 3 to 10.

3. A process for preparing an aliphatic diisocyanate comprising heating, in the presence of an agent selected from the group consisting of phosgene and thionyl chloride, a dihydroxamic acid of the following formula:

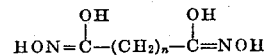

wherein $n$ represents a positive integer of from 3 to 10.

4. A process for preparing an aliphatic diisocyanate comprising heating, in the presence of an agent selected from the group consisting of phosgene and thionyl chloride, in an inert liquid, a dihydroxamic acid of the following formula:

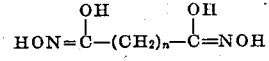

wherein $n$ represents a positive integer of from 3 to 10.

5. A process for preparing an aliphatic diisocyanate comprising heating, in the presence of an agent selected from the group consisting of phosgene and thionyl chloride, an alkali metal dihydroxamate of the following formula:

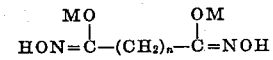

wherein M represents an alkali metal and $n$ represents a positive integer of from 3 to 10.

6. A process for preparing an aliphatic diisocyanate comprising heating, in the presence of an agent selected from the group consisting of phosgene and thionyl chloride, in an inert liquid, an alkali metal dihydroxamate of the following formula:

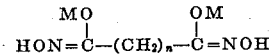

wherein M represents an alkali metal and $n$ represents a positive integer of from 3 to 10.

JOSEPH B. DICKEY.
JAMES M. STRALEY.
THEODORE E. STANIN.